United States Patent
Wang et al.

(10) Patent No.: US 7,238,052 B2
(45) Date of Patent: Jul. 3, 2007

(54) CARD CONNECTOR WITH ANTI-MISMATING DEVICE

(75) Inventors: Hong-Liang Wang, Kunshan (CN); Chi Zhang, Kunshan (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 11/580,565

(22) Filed: Oct. 12, 2006

(65) Prior Publication Data
US 2007/0087601 A1    Apr. 19, 2007

(30) Foreign Application Priority Data
Oct. 13, 2005    (CN)    ........................ 2005 2 0076409

(51) Int. Cl.
*H01R 24/00* (2006.01)
(52) U.S. Cl. ....................................................... 439/630
(58) Field of Classification Search ................ 439/630, 439/633, 159
See application file for complete search history.

(56) References Cited

U.S. PATENT DOCUMENTS

| | | | | |
|---|---|---|---|---|
| 5,451,168 A * | 9/1995 | Shuey | ........................ | 439/159 |
| 6,609,919 B2 * | 8/2003 | Ito et al. | ...................... | 439/159 |
| 6,729,892 B2 * | 5/2004 | Takada et al. | .............. | 439/159 |
| 6,851,959 B2 * | 2/2005 | Ooya et al. | ................. | 439/159 |
| 6,905,369 B2 * | 6/2005 | Nakai et al. | ................. | 439/630 |
| 7,070,430 B2 * | 7/2006 | Yang et al. | ................. | 439/159 |
| 2004/0132326 A1 * | 7/2004 | Matsunaga et al. | ......... | 439/159 |

* cited by examiner

*Primary Examiner*—Neil Abrams
*Assistant Examiner*—Phuongchi Nguyen
(74) *Attorney, Agent, or Firm*—Wei Te Chung

(57) ABSTRACT

A card connector (1) includes an insulating housing (2); a number of contacts (3) retained in the insulating housing (2) and a shell (4). The shell (4) covers the insulating housing (2) to define a card receiving space therebetween and defines a card insertion direction. The contacts (3) comprise a number of contacting portions (32) exposed into the card receiving space. A stopper (44) is formed on the shell (4) and protruding into the card receiving space and comprises a stopping portion (440) approximately uprightly exposed into the card receiving space along the card insertion direction to prevent the card from mis-insertion.

9 Claims, 5 Drawing Sheets

CARD CONNECTOR WITH ANTI-MISMATING DEVICE

BACKGROUND OF THE INVENTION

1. Field of the Invention

The present invention is generally related to a card connector, and especially to a card connector with an anti-mismating device.

2. Description of Related Art

With the development of electronic appliances, different electrical cards are used to expand additional functions of the electronic appliance, such as data storage. A card connector is required to receive the electrical card to achieve the storage function between the electrical card and the corresponding electronic appliance. However, a user may insert the electrical card into the card connector in an improper state by mistake. In this situation, the card connector, the electrical card and even the electronic appliance may be damaged. Thus, one way to solve the above mention problem is to design the card connector with an anti-mismating device.

A common card connector adapted for receiving a card comprises an insulating housing, a plurality of contacts received in the insulating housing and a shell covering the insulating housing. The card connector defines a card receiving space between the insulating housing and the shell. The shell is formed with a stopper uprightly protruding downwardly into the card receiving space and arranged along a transverse direction perpendicular to a card insertion direction. When the card is properly inserted, the stopper will be accommodated in a slot formed in the card and does not prevent the card from inserting into the card connector to electrically connect with the contacts.

When the card is improper inserted, such as in an adverse fashion, the stopper will be collide with the card to prevent the card from electrically connecting with the contacts. However, because the stopper uprightly arranges along the transverse direction, intensity of the stopper is weakened. When the card is improper inserted some times by mistake, the stopper may be deflected from an original position due to collision of the card and does not prevent the card from electrically connecting with the contacts.

Hence, an improved card connector is highly desired to overcome the aforementioned disadvantages of the prior art.

SUMMARY OF THE INVENTION

Accordingly, an object of the present invention is to provide a card connector with an anti-mismating device.

To achieve the above object, a card connector comprises an insulating housing; a plurality of contacts retained in the insulating housing and a shell. The shell covers the insulating housing to define a card receiving space therebetween and defines a card insertion direction. The contacts comprise a plurality of contacting portions exposed into the card receiving space. A stopper is formed on the shell and protruding into the card receiving space and comprises a stopping portion approximately uprightly exposed into the card receiving space along the card insertion direction to prevent the card from mis-insertion.

Other objects, advantages and novel features of the present invention will be drawn from the following detailed description of a preferred embodiment of the present invention with attached drawings.

BRIEF DESCRIPTION OF THE DRAWINGS

FIG. 1 is an assembled, perspective view of a card connector in accordance with the present invention with a card accommodated in;

DETAILED DESCRIPTION OF THE INVENTION

Figure 1:
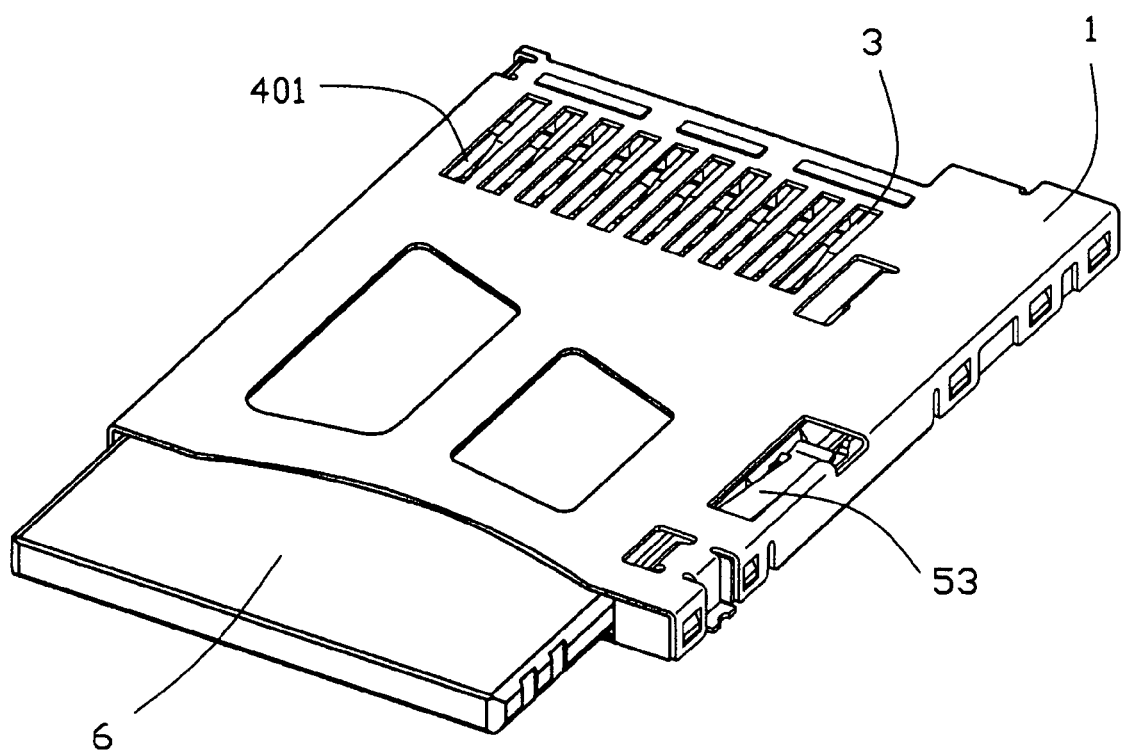
Figure 2:
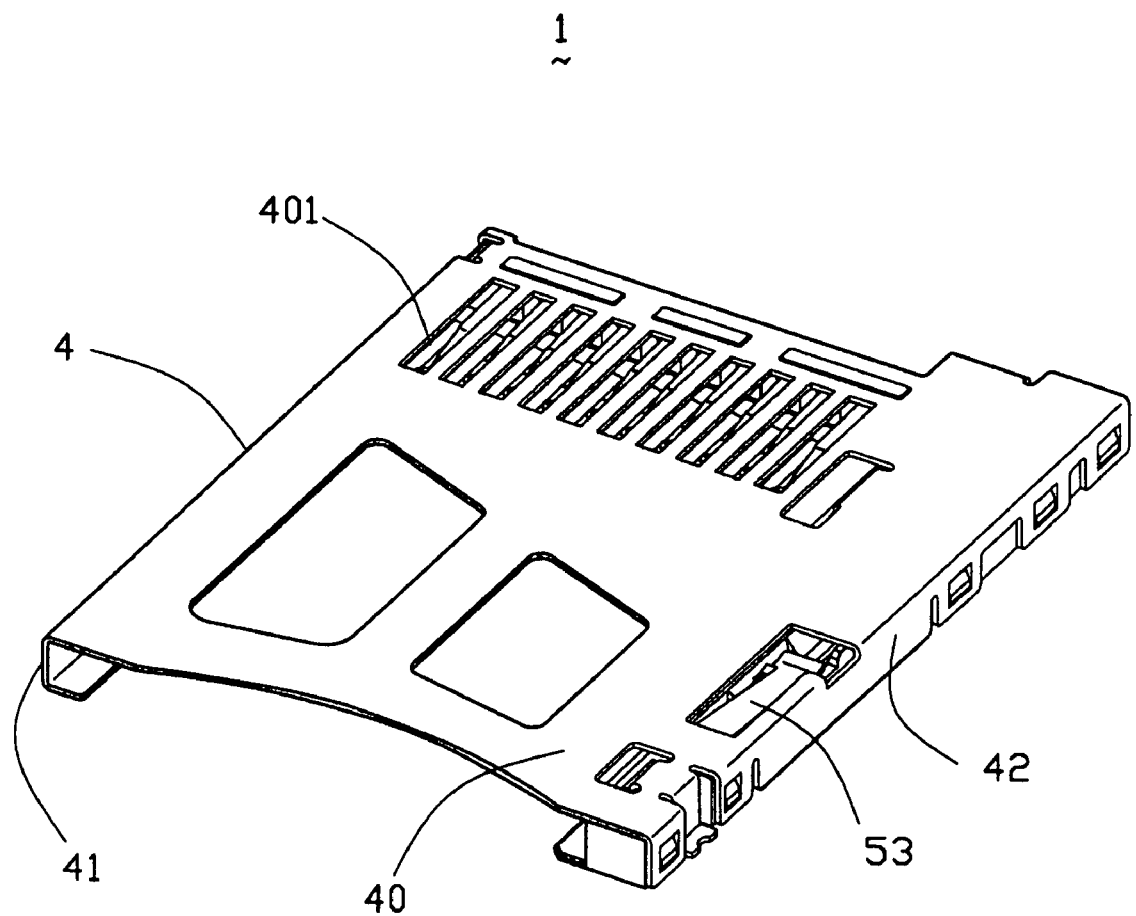
FIG. 2 is an assembled, perspective view of the card connector of FIG. 1.

Reference will now be made in detail to the preferred embodiment of the present invention.

Referring to FIGS. 1–5, the card connector 1 of the present invention adapted for receiving a card 6 comprises an insulating housing 2, a plurality of contacts 3 received in the insulating housing 2, a shell 4 and an ejector 5.

Figure 4:
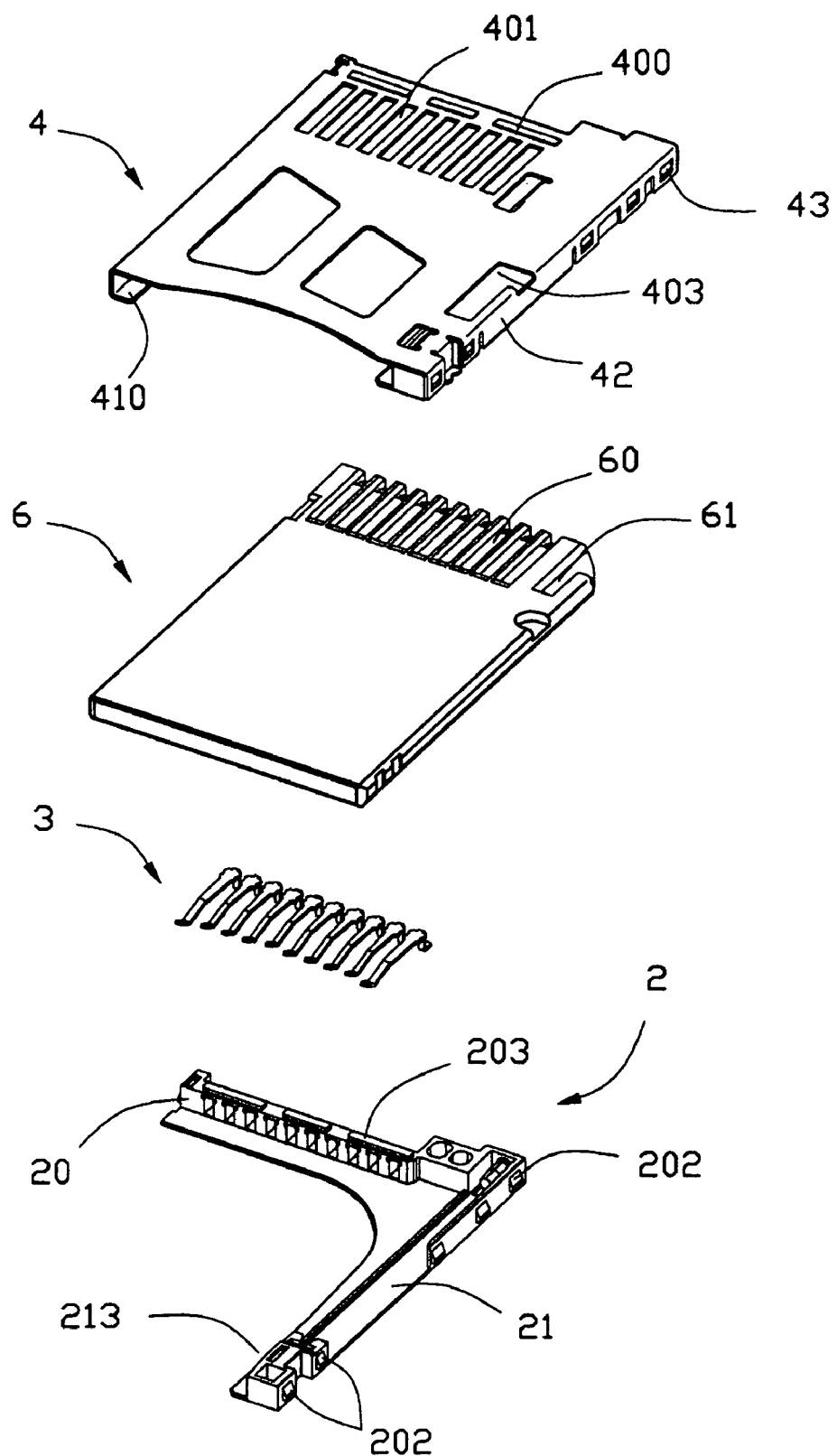
FIG. 4 is a partially exploded, perspective view of the card connector of FIG. 1 with the card.
Figure 5:
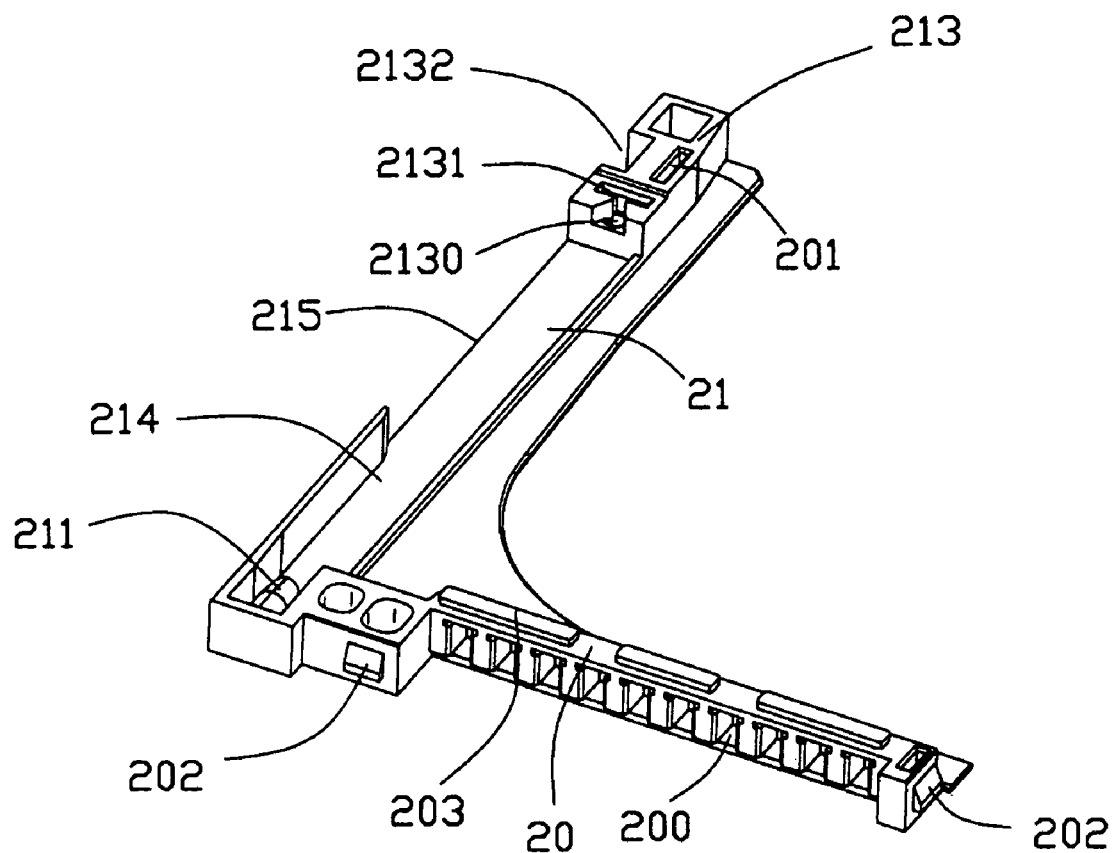
FIG. 5 is perspective view of the insulating housing of the card connector of FIG. 1.

Referring to FIGS. 4–5, the insulating housing 2 is approximately L-shaped, the insulating housing 2 comprises a rear wall 20, a right sidewall 21 extending forwardly from right end of the rear wall 20 and a bottom wall 22. The insulating housing 2 is formed with a plurality of wedges 202 on outside of the rear wall 20 and the sidewall 21. The rear wall 20 is formed with a plurality of bars 203 on upper face thereof and defines a plurality of receiving passages 200 running through the rear wall 20.

The shell 4 covers the insulating housing 2 and defines a card receiving space (not labeled) therebetween with an entrance opening (not labeled) at front end of the card connector 1. Each contact 3 comprises a holding portion 31 securely held in the receiving passages 200, a soldering portion 30 extending rearward from the holding portion 31 to solder on a printed circuit board (not shown) and a contacting portion 32 extending forwardly from the soldering portion 30 and exposed in the card receiving space.

Figure 3:
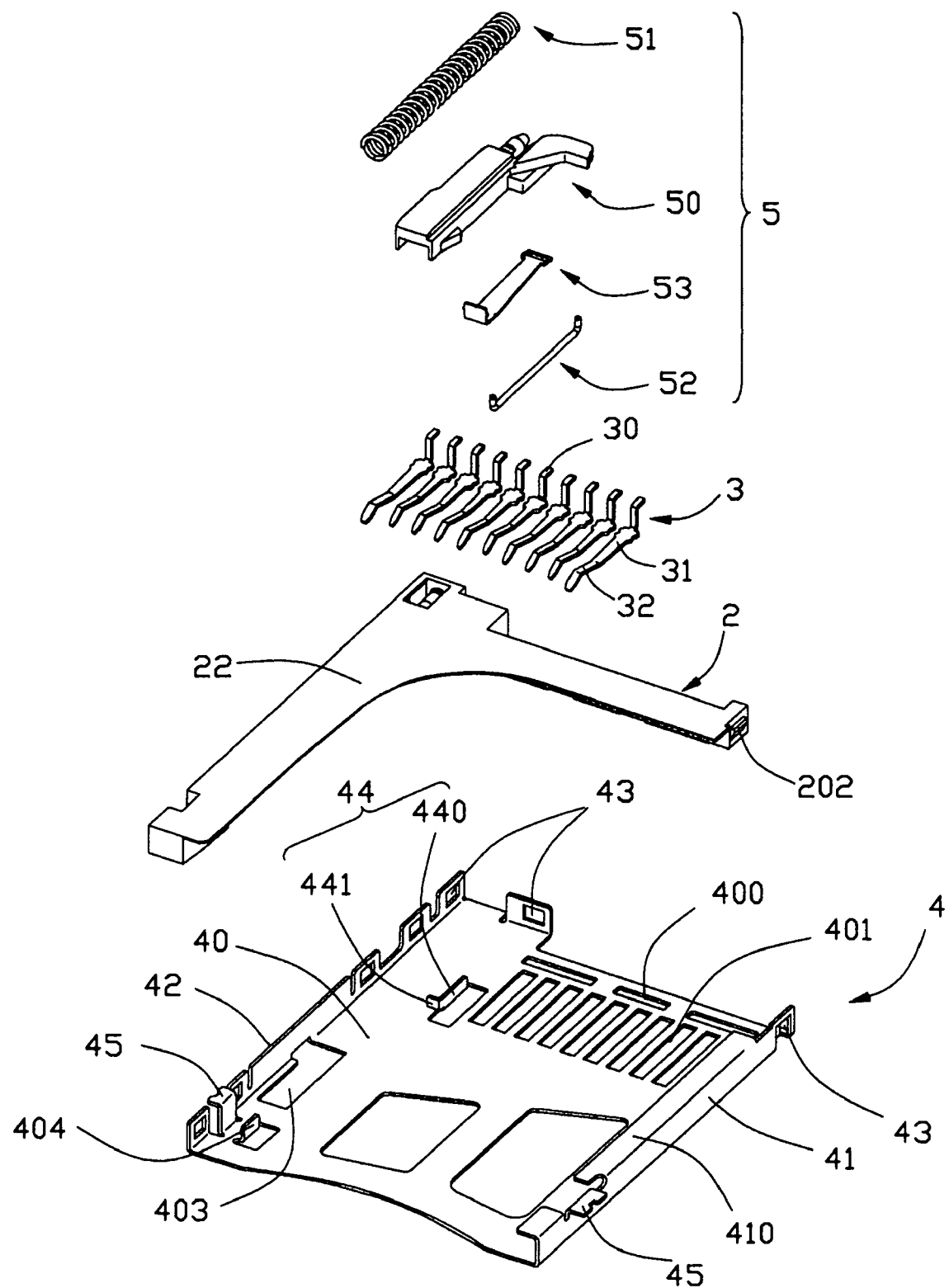
FIG. 3 is an exploded, perspective view of the card connector of FIG. 2.

Referring to FIGS. 3 and 5, the right sidewall 21 defines a cavity 214 to accommodate the ejector 5 and the sidewall 21 defines a cut 215 adjacent to front end thereof to communicate with the cavity 214. A block portion 213 is formed on front end of the sidewall 21 due to the cavity 214. The block portion 213 defines a concave 201, a holding cut 2131 and a pinhole 2130 along a card insertion direction. A cutout 2132 is formed on the block portion 213 opposite to the concave 201. A column 211 protrudes into the cavity 214 from rear end of the sidewall 21.

The ejector 5 comprises a slider 50 accommodated in the cavity 214, a pin member 52, a spring 51 and a resilient member 53. One end of the pin member 52 is secured in the pinhole 2130 and the other end is moveably received in a hear-shaped slot recessed downwardly form an upper face of the slider 50. One end of the spring is received in a hole recessed forwardly from rear end of the slider 50 and the other end is disposed around the column 211 of the sidewall 21. One end of the resilient member 53 is secured in the holding hole 2131 and the other end presses downwardly the pin member 52 into the hear-shaped slot of the slider 50. When a card is inserted, the card will push the slider to move to a locked position to electrically connect with the contacts 3. In this position, the pin member 52 cooperates with the hear-shaped slot to make the slider in the locked position and the spring 51 is pressed to produce elastic deformation.

When pushing the card rearward again, the spring 51 cooperates with the pin member 52 and the heart-shaped slot to urge the slider 50 to move forwardly and then eject the card out of the card connector 1.

Referring to FIGS. 3–5, the shell 4 is stamped from a metal sheet and comprises a main body 40 and a pair of left and right side portions 41, 42 extending downwardly from opposite lateral sides of the main body 40. The left side portion 41 is formed with a horizontal portion 410 extending towards the card receiving space and served as a guiding portion. The right side portion 42 and rear end of the main body 40 adjacent to the right side portion 42 define a plurality of mating holes 43 to accommodate the wedges 202 of the insulating housing 2. A pair of soldering feet 45 are formed on the left and right side portions 41, 42 respectively and the right soldering foot 45 is received in the cutout 2132. The main body 40 defines a plurality of rectangular holes 400 at rear end thereof along a transverse direction perpendicular to the card insertion direction to accommodate the bars 203 of the insulating housing 2 and formed with a locking portion 404 formed at front end thereof adjacent to the right side portion 42 to lock in the concave 201. Thus, the shell 4 securely covers the insulating housing 2. An opening 403 corresponding to the resilient member 53 is formed at front end of the main body 40 adjacent to the right side portion 42.

The main body 40 defines a plurality of escaping holes 401 at rear end thereof corresponding to the contacting portions 32 of the contacts 3. The main body 40 further forms a stopper 44 thereof adjacent to the right side portion 42. The stopper 44 is uprightly exposed into the card receiving space. The stopper 44 comprises a stopping portion 440 arranging along the card insertion direction and a protection portion 441 bended perpendicularly to the stopping portion 440 from a front end of the stopping portion 440 adjacent to the entrance opening to avoid the sharp front end of the stopping portion 440 damaging the card 6.

The card 6 forms a plurality of contacting pads 60 at rear end thereof to electrically connect with the contacting portions 32 of the contacts 3 when the card is properly inserted. A rectangular slot 61 is formed on rear end of the card 6 corresponding to the stopper 44. When the card 6 is properly inserted, the protection portion 441 and the stopping portion 440 are received in the slot 61 of the card 6. Thus, the stopper 44 does not collide with the card 6. When the card 6 is improperly inserted, because the stopper 44 protrudes into the card receiving space, the stopper 44 collides with the rear end of the card 6 to prevent the card from inserting into the card connector 1. Thus, avoiding improper insertion of the card 6.

While a preferred embodiment in accordance with the present invention has been shown and described, equivalent modifications and changes known to persons skilled in the art according to the spirit of the present invention are considered within the scope of the present invention as described in the appended claims.

What is claimed is:

1. A card connector comprising:
   an insulating housing;
   an ejector;
   a plurality of contacts retained in the insulating housing;
   a shell covering the insulating housing to define a card receiving space therebetween and defining a card insertion direction, the contacts comprising a plurality of contacting portions exposed into the card receiving space; and
   a stopper formed on the shell and protruding into the card receiving space and comprising a stopping portion approximately uprightly exposed into the card receiving space along the card insertion direction to prevent a card from mis-insertion; the stopper comprises a protection portion bent substantially perpendicularly from a front end of the stopping portion to form a planar member facing along the card insertion axis to prevent the card from electrically connecting with the contacts, when the card is improperly inserted.

2. The card connector as described in claim 1, wherein the insulating housing is approximately L-shaped.

3. The card connector as described in claim 1, wherein the shell forms a plurality of escaping holes at rear end thereof corresponding to the contacting portions of the contacts.

4. The card connector as described in claim 1, wherein the insulating housing is formed with a plurality of bars on an upper face of a rear wall thereof, and wherein the shell forms with corresponding rectangular holes to mate with the plurality of bars.

5. An electrical card connector comprising:
   an insulating housing;
   an ejector;
   a plurality of contacts retained in the insulating housing;
   a shell attached to the insulating housing to define a card receiving space therebetween and defining a card insertion direction, the contacts comprising a plurality of contacting portions extending into the card receiving space; and
   an un-deflectable stopper formed on the shell and protruding into the card receiving space and comprising a stopping portion directly stamped from the shell to invade the card receiving space for preventing a card from mis-insertion, and a protection portion supportably located at an end of said stopping portion; wherein said protection portion defines a plane perpendicular to said card insertion direction to prevent the card from electrically connecting with the contacts, when the card is improperly inserted.

6. The card connector as claimed in claim 5, wherein the protection portion integrally extends from the stopping portion directly.

7. The card connector as claimed in claim 5, wherein the protection portion is connected to the shell only via said stopping portion.

8. The card connector as claimed in claim 5, wherein said shell defines an opening located adjacent to said stopper and dimensioned to be larger than said stopper.

9. The card connector as claimed in claim 5, wherein said stopping portion extends along said card insertion direction.

* * * * *